Figure 1:
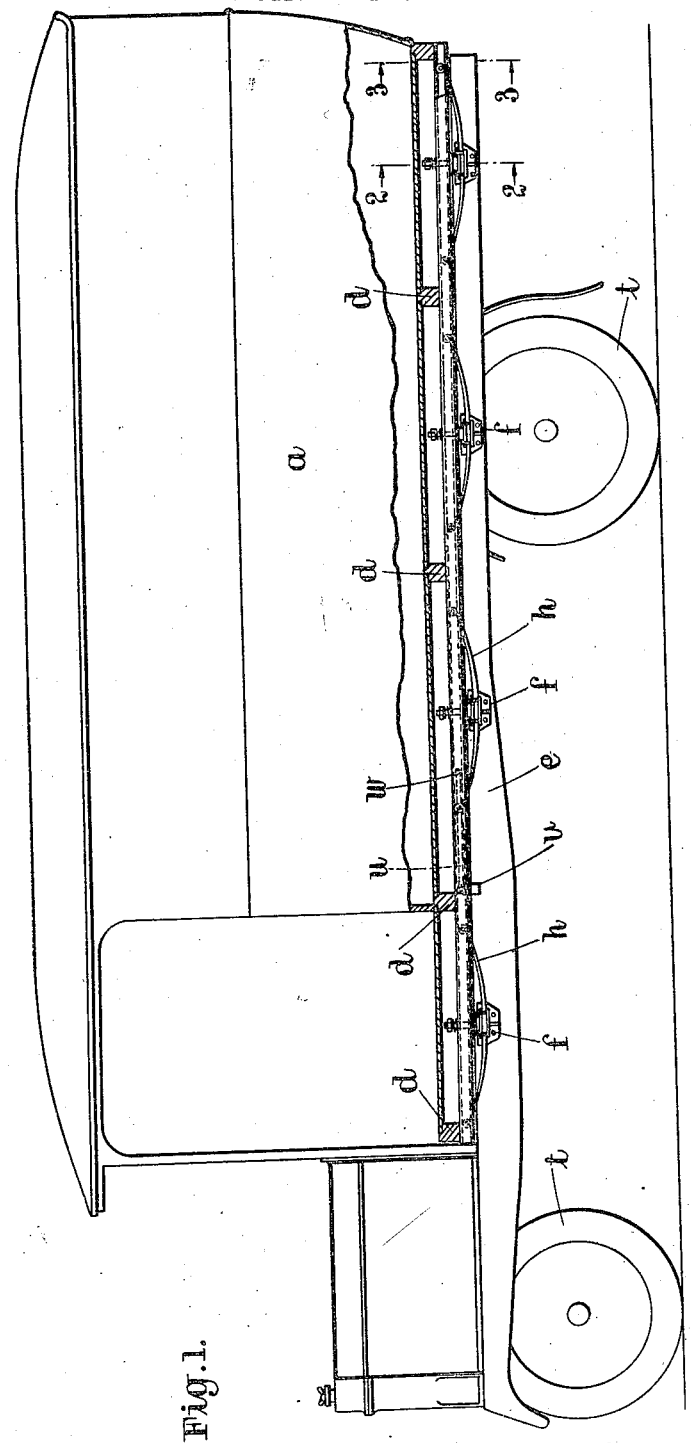

Dec. 13, 1927. 1,652,841
J. M. STRACHAN
SPRING SUSPENSION OF MOTOR AND OTHER VEHICLE BODIES
Filed July 5, 1924   4 Sheets-Sheet 2

INVENTOR
James M. Strachan
by Wm. H. Babcock & Son
Attorneys

Dec. 13, 1927.  1,652,841
J. M. STRACHAN
SPRING SUSPENSION OF MOTOR AND OTHER VEHICLE BODIES
Filed July 5, 1924  4 Sheets-Sheet 3

INVENTOR
James M. Strachan
by W. H. Babcock & Son
Attorneys

Dec. 13, 1927. 1,652,841

J. M. STRACHAN

SPRING SUSPENSION OF MOTOR AND OTHER VEHICLE BODIES

Filed July 5, 1924 4 Sheets-Sheet 4

INVENTOR
James M. Strachan
by Wm. H. Babcock & Son
Attorneys

Patented Dec. 13, 1927.

1,652,841

UNITED STATES PATENT OFFICE.

JAMES MARSHALL STRACHAN, OF NORTH ACTON, LONDON, ENGLAND.

SPRING SUSPENSION OF MOTOR AND OTHER VEHICLE BODIES.

Application filed July 5, 1924, Serial No. 724,432, and in Great Britain July 19, 1923.

This invention relates to motor and other vehicles and has for its object improvements in the springs thereof and the mode of supporting the body of the vehicle on the chassis.

According to the present improvements the chassis is provided with a suitable number of semi-elliptical springs on both sides that are supported at or near their respective centres by brackets secured to the chassis in suitable positions, to which brackets the said springs are clamped by plates that may be provided with upwardly projecting bolts.

The ends of the springs are bent around pins that extend on each side and are provided with rollers, slides, links or equivalent parts by which a subsidiary frame to which the car body is secured, is supported.

The hereinbefore mentioned bolts that project upwardly from the clamping plates at the centre of the springs may pass through holes in the subsidiary frame which comprises longitudinal members of suitable cross-section such as an inverted U-section the legs of which are provided with inwardly projecting flanges leaving a space between them through which the ends of the springs extend so that the aforesaid rollers or equivalent parts may operate in the channel formed on each side of the said longitudinal members above the flanges.

The holes in the subsidiary frame through which the aforesaid upwardly extending bolts pass are situated in the horizontal portion of the said longitudinal members between the parts engaged by the rollers or equivalents and said bolts may be maintained therein by nuts.

Helical compression springs may surround the bolts between the said longitudinal members and the nuts so as to produce an elastic joint and rubber or other suitable buffer-rings may surround the base of the bolts beneath the said longitudinal members so as to provide a cushion between the subsidiary frame and the springs if the latter should be unduly compressed.

The aforesaid bolts prevent transverse movement between the car body and chassis and longitudinal movement between these parts is prevented by one or more horizontal links one end of which is pivoted to the chassis and the other to the subsidiary frame.

With this arrangement the rollers or equivalent parts at the extremities of the semi-elliptical springs may roll or slide upon the under surface of the subsidiary frame or be pivotally connected to its vertical sides so as to swing when the springs are compressed and the car body may be prevented from rising too high when the springs recover themselves by suitable stops, such as the hereinbefore mentioned helical springs that surround the bolts that couple the said frame to the chassis.

I will now proceed to more particularly describe my invention with the aid of the accompanying drawings in which—

Figure 2:
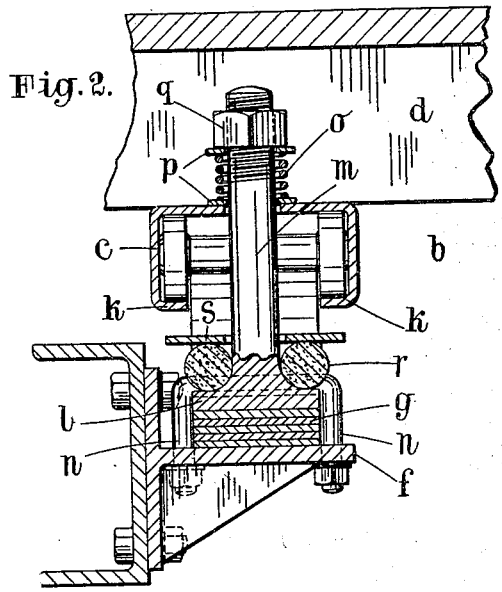
Figure 3:
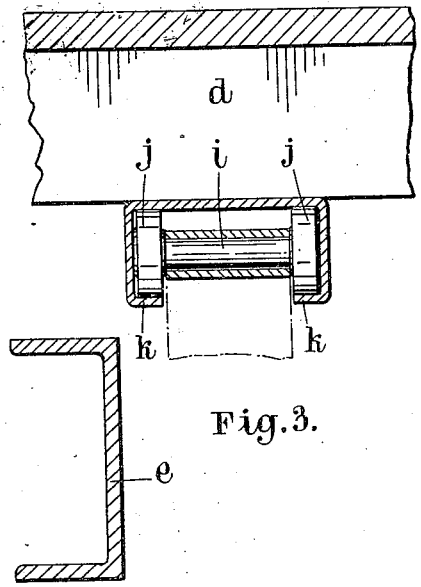
Figure 10:
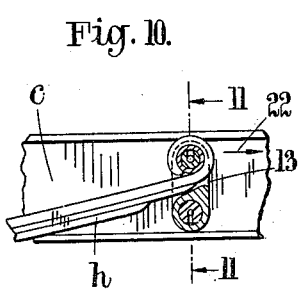
Figure 11:
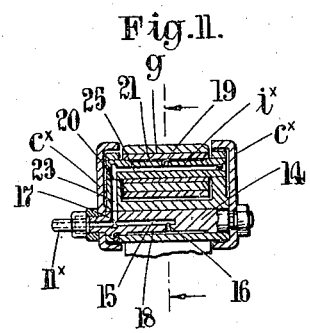
Figure 4:
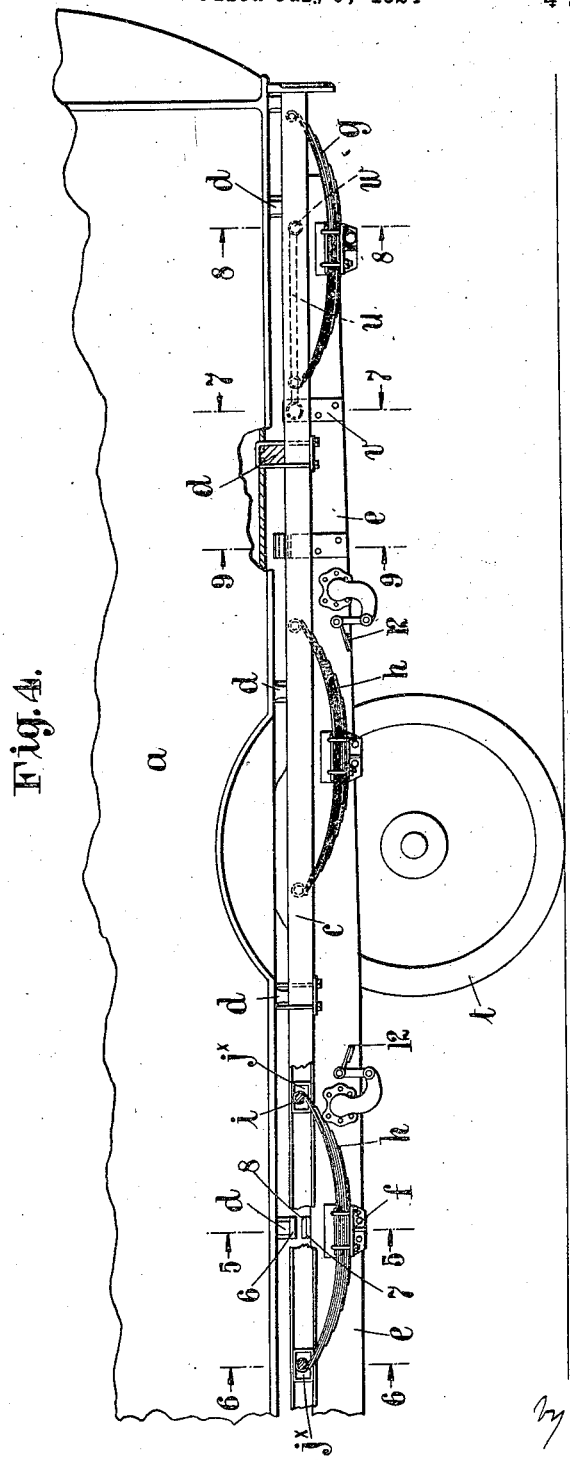
Figure 5:
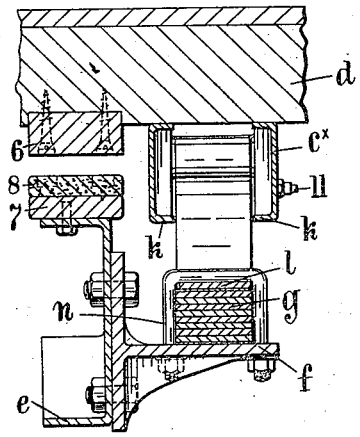
Figure 6:
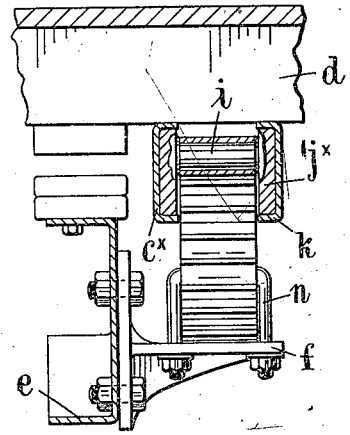

Fig. 1 is a part sectional side elevation of a motor vehicle constructed according to the present invention with the near wheels removed to show the parts behind them, Fig. 2 is a transverse section through one of the side members of the chassis and subsidiary frame, on the line 2—2 in Fig. 1, Fig. 3 is a transverse section on the line 3—3 in Fig. 1, Fig. 4 is a similar view to that shown in Fig. 1 illustrating another construction, Figs. 5, 6, 7, 8 and 9 are respectively transverse sections through one of the side members of the chassis and subsidiary frame in the planes indicated by the lines 5—5, 6—6, 7—7, 8—8 and 9—9 in Fig. 4, Fig. 10 is a sectional elevation of the end of one of the semi-elliptical springs and part of the subsidiary frame illustrating a modified construction and Fig. 11 is a transverse section on the line 11—11 in Fig. 10.

According to the construction shown in Figs. 1 to 3 the vehicle body $a$ is supported upon a subsidiary frame $b$ comprising longitudinal side-members $c$ tied together by transverse members which may be the crossbeams $d$ of the body.

The chassis $e$ is provided with road wheels $t$ sprung in the usual way and has suitable brackets $f$ bolted to it that support the leaves $g$ of semi-elliptical springs $h$. The extremities of the upper leaf $g$ of these springs are bent around pins $i$ on whose ends are mounted rollers $j$ adapted to roll in guides formed in the longitudinal members $c$ of the subsidiary frame. The longitudinal members $c$ are of inverted U-section with inwardly projecting flanges $k$ at the lower ends of the legs of the U which form lateral channels within which the rollers $j$ are adapted to roll. With this arrangement the ends of the elliptical springs extend between the legs of the U so as to support the rollers in position.

The leaves $g$ are clamped between their respective brackets $f$ and a plate $l$ having an upwardly extending pin $m$ by U-shaped clamping bolts $n$. The upwardly extending pin $m$ is screw-threaded and passes through a hole in the longitudinal members $c$ whereafter it is surrounded by a helical spring $o$ situated between washers $p$ and there retained by a nut $q$ which limits the upward movement of the car body which is cushioned by the spring $o$.

The pin $m$ is surrounded at its base by a buffer ring $r$ having a plate $s$ above it which together form a cushioning stop to limit the compression of the springs $h$.

Connecting links $u$ are pivoted to brackets $v$ on each side of the chassis and to suitable pivots $w$ extending laterally from the longitudinal members $c$ of the subsidiary frame in order to prevent undue longitudinal movement.

According to the construction shown in Figs. 4 to 9 the longitudinal members $c$ are each composed of two portions $c^x$ connected together by bolts 1 which pass through tubular distance pieces 2 (Fig. 9) and are secured to the cross-beams $d$ of the body $a$ by U-shaped bolts 3 that span them and each of the said longitudinal members which are maintained in position by plates 4 and nuts 5.

The springs $h$ are supported by brackets $f$ as in the construction illustrated by Figs. 1 to 3 but the upwardly extending pins $m$ are dispensed with and sliding blocks $j^x$ are employed instead of the rollers $j$.

Figure 7:
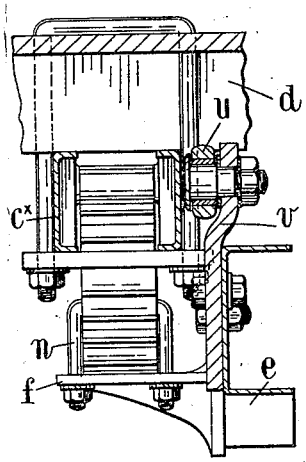
Figure 8:
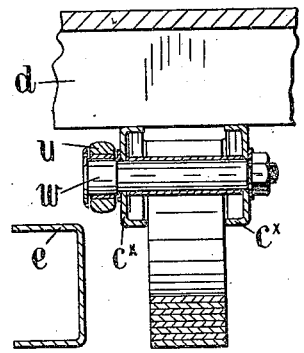
Figure 9:
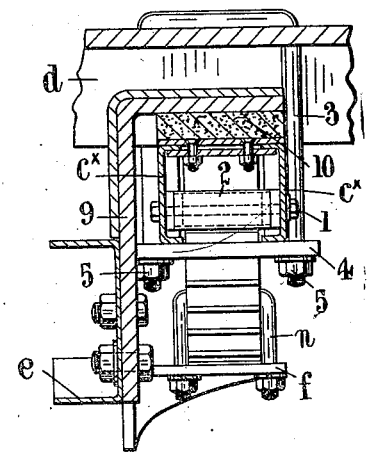

Links $u$ connect the body with the chassis on both sides and are pivoted to brackets $v$ bolted to the latter and to a pin $w$ that passes through the longitudinal members $c$ of the subsidiary frame (Figs. 7 and 8). Lateral displacement of the body is prevented by the springs $h$ the ends of which extend between the portions $c^x$ of the longitudinal members $c$.

Blocks of wood or other suitable material 6, 7 are secured to the body and chassis at points opposite each other at suitable intervals to limit the compression of the springs and one of these may be provided with a cushion 8 of elastic material to form a buffer between them.

The chassis is also provided with angle brackets 9 which project above the longitudinal members $c$ between the body bearers to limit the upward movement of the body and a pad 10 of suitable elastic material is secured to the said longitudinal members to form a cushion between them.

In order to provide for the lubrication of the blocks $j^x$ the longitudinal members $c$ are provided at suitable points with nipples 11 to which a grease pump may be connected for the purpose of introducing a lubricant.

The road wheels $t$ are mounted on an axle journalled in boxes (not shown) upon which the chassis is supported by springs 12 connected thereto in the usual way by which the shock of running is first received but the momentum of the vehicle body due to the movement resulting from the operation of the springs 12 is absorbed by the springs $h$ whose ends are separated by the load and thus cause the blocks $j^x$ to slide in the channels formed on the inner side of the portions $c^x$ of the longitudinal members $c$.

According to a modified construction illustrated by Figs. 10 and 11 the ends of the top leaf $g$ of the semi-elliptical springs $h$ are pivoted to the upper ends of links or shackles 13 whose lower ends are connected to the longitudinal members $c$ of the subsidiary frame by bolts 14 that extend between the portions $c^x$.

The bolt 14 is provided with a central bore 15 extending from one end and communicates with radial ports 16 and 17 through which a lubricant may be forced by a pump (not shown) connected to the nipple $11^x$ into the channel 18 formed on the outer surface of the bolt 14.

The pin $i^x$ that connects the ends of the semi-elliptical spring $h$ to the shackle 13 is also provided with a bore 25 having ports 19 and 20 the latter of which communicates through the duct 23 in the shackle 13 with the port 17 formed in the bolt 14 by which lubricant is led to the bore 25 whence it passes by the port 19 to the channel 21 formed on the surface of the pin $i^x$. With this arrangement the upper end of the shackle is caused to swing outwardly in the direction of the arrow 22 in Fig. 10 when the semi-elliptical springs $h$ are compressed.

In some cases the links $u$ may be dispensed with when the construction illustrated by Figs. 10 and 11 is adopted.

I claim:

1. In a vehicle, a frame, a body, axles, and springs mounting said frame on said axles, in combination with a supplemental frame comprising two longitudinally extending downwardly presented channel members secured to said body, each said member having two lower horizontal flanges presented toward each other and separated by a central longitudinal slot, each said flange together with its respective side and top portion of its member constituting a guideway, leaf-springs mounted on said frame, elements slidably mounted in said channel members and guided by the guideways thereof, said leaf springs having their end portions respectively directly connected to their respective slidably mounted elements, means for mounting said leaf-springs on said frame, each said means comprising a vertically extending bolt received through a perforation in said supplemental frame, cushioning elements arranged respectively immediately above and below said supplemental frame about each said bolt to cushion said supplemental frame against rebound and excessive jolts, means on the ends of said bolts respectively for retaining the respective upper cushioning means thereon, and longitudinally extending rigid means pivotally connected at its respective end portions to said frame and said supplemental frame respectively to limit relative longitudinal movement between said frames, the said leaf-springs, slidable elements and channel members cooperating in tending to prevent relative transverse movement between said frames, and said bolts tending to prevent relative transverse, and also relative longitudinal, movement between said frames.

2. In a vehicle, a frame, a body, axles, and springs mounting said frame on said axles, in combination with a supplemental frame comprising two longitudinally extending downwardly presented channel members secured to said body, each said member having two lower flanges presented toward each other and separated by a central longitudinal slot, each said flange together with its respective side and top portion of its member constituting a guideway, leaf-springs mounted on said frame, elements movably mounted in said channel members and guided by the guideways thereof, said leaf-springs having their end portions respectively directly connected to their respective movable means, and longitudinally extending rigid means pivotally connected at its respective end portions to said frame and said supplemental frame respectively to limit relative longitudinal movement between said frames, the said leaf-springs, movable elements and channel members all cooperating in tending to prevent relative transverse movement between said frames.

3. In a vehicle, a frame, a body, axles and springs mounting said frame on said axles, in combination with a supplemental frame comprising two longitudinally extending downwardly presented channel members secured to said body, each said member having two lower flanges presented toward each other and separated by a central longitudinal slot, each said flange together with its respective side and top portion of its member constituting a guideway, leaf-springs mounted on said frame, and elements movably mounted in said channel members and guided by the guideways thereof, said leaf-springs having both their end portions respectively connected to their respective cooperating movable means, the said leaf-springs, movable elements and channel members all cooperating in tending to prevent relative transverse movement between said frames.

4. In a vehicle, a frame, a body, axles, and springs mounting said frame on said axles, in combination with a supplemental frame comprising two longitudinally extending downwardly presented channel members secured to said body, each said member having two transversely extending lower flanges presented toward each other and separated by a central longitudinal slot, each said flange together with its respective side and top portion of its member constituting a guideway, leaf-springs mounted on said frame, and elements slidably mounted in said channel members and guided by the guideways thereof, said leaf-springs having both their end portions respectively connected to their respective cooperating slidably mounted means, the said leaf-springs, slidably mounted elements and channel members all cooperating in opposing relative transverse movement between said frames.

In testimony whereof, I have signed my name to this specification at 15, Cavendish Square, London, England, this 5th day of June, 1924.

JAMES MARSHALL STRACHAN.